Patented Jan. 12, 1943

2,307,756

UNITED STATES PATENT OFFICE 2,307,756

VITAMIN CONTAINING SHORTENING

James G. Blaso, East Elmhurst, Long Island, N. Y., assignor, by direct and mesne assignments, to Natural Vitamin Corporation, a corporation of New Jersey No Drawing. Application February 8, 1940, Serial No. 318,001

3 Claims. (Cl. 99—123)

This invention relates to cooking fats, and relates particularly to hydrogenated fish oils processed for use as shortening and other cooking fat purposes.

Cooking fats quite commonly consist of the normal animal fats, largely stearates, which are separated in the course of the preparation of meats generally. These are clear white fats of relatively little odor and taste, and such odor and taste as occurs is of a pleasant character. Alternatively, certain vegetable oils are used for cooking fats, some directly, and some after processing by a partial hydrogenation. The fish oils are not, however, commonly used for cooking fats, because of the highly unpleasant odor and taste present in substantially all of them, especially the fish liver oils from the presence of clupanodonic acids, and accordingly the only comestible use for fish oils has been as medicaments because of the presence of relatively high concentrations of vitamins A, D, and small amounts of E in the oil.

The present invention utilizes fish oils, with or without the vitamin content but preferably with the vitamin content for shortening and other cooking purposes after preparation of the oils by a partial hydrogenation to modify the clupanodonic acids and other objectionably flavored or odored oils, whereby a clear, white, palatable oil or fat of suitable melting point is obtained which can be used for baking, frying, shortening, and cooking generally.

Thus, an object of the invention is to deodorize fish oils and simultaneously to adjust the melting point to a value suitable for cooking purposes. Another object is to deodorize fish oils for use as cooking fats, while retaining a substantial portion of the vitamin content of the oil in the finished fat. Another object of the invention is to deodorize a fish oil by a combination of processings including hydrogenation and steam and vacuum processing to remove substantially all taste and odor therefrom while adjusting the melting point to a suitable value for cooking purposes. Other objects and details of the invention will be apparent from the following description.

In practicing the invention, the fish livers and other fatty fish tissues are expressed to remove the fluid oil. The oil is decanted from watery fluids and filtered to remove fragments of tissue and other foreign matter. The filtered oil is then desirably refined by a washing treatment with an alkaline fluid, which is preferably a dilute solution of sodium hydroxide in water, but may be other alkaline solutions. This treatment is desirable for the removal of free fatty acids and other impurities which tend to limit or modify the hydrogenation reaction in undesirable ways. The refined fish oil is then treated with an appropriate amount of nickel formate as hydrogenation catalyst. The amount of nickel formate added is desirably approximately 0.2% to 0.5% of catalyst computed as metallic nickel based on the total amount of the oil to be hydrogenated. The nickel formate may be added directly to the fish oil, but preferably the hydrogenation catalyst is prepared by suspending the powdered nickel formate in a small quantity of oil or melted fat such as cottonseed oil; then heating the mixture to a temperature ranging from 250° to 275° C. and passing a current of hydrogen gas through the mixture to reduce the nickel formate to finely divided metallic nickel. A suitable catalyst promoter, such as aluminum powder, may be added, and a filter aid such as Kieselguhr or the siliceous material known as Sil-O-Cel may also be added. This catalyst preparation may be added directly to the fish oil, or a substantial portion of the preparation oil may be filtered out as desired. The fish oil with the suspended catalyst is then passed to the reactor in which it is treated with hydrogen under pressure and heated to a temperature somewhat below that at which the desired vitamins begin to decompose. This temperature of decomposition for vitamin D is approximately 120° C. and if the fish oil and catalyst are heated to a temperature ranging from 110° to 120° C., the hydrogenation occurs rapidly and effectively with substantially no destruction of vitamin D and partial destruction only of vitamin A. Alternatively, the temperature may be kept below 50° to 60° C., at which temperatures neither vitamin A nor vitamin D is decomposed or destroyed. The latter procedure is preferable, since substantially all vitamins such as A, D and E will be retained in the finished product.

It is desirable that a certain amount of stearin be produced in the hydrogenator. A simple propeller type of stirring device operating at speeds ranging from 150 to 300 per minute is sufficient when the hydrogen pressure is maintained in the neighborhood of 200 to 500 lbs. per sq. in. At such pressures, solid fine grained fatty acid glycerides are formed which make it particularly advantageous in the preparation of a shortening. At pressures below 200, the fatty acid glycerides formed are soft and viscous, and do not lend themselves for shortening purposes.

It may be noted that when the catalyst is wetted with the oil, there is no possibility of any direct contact between catalyst and gas and the hydrogen reaches the catalyst only by solution in the oil. Accordingly, only such an amount of stearin is required as will promote a reasonably rapid solution of the hydrogen in the heated oil and this purpose is adequately served by a moderately rapid renewal of the surface of oil against which the hydrogen is applied.

It is found that simple diffusion of hydrogen through the oil aided by a leisurely stirring is ample for the hydrogenation reaction. The hydrogenation is continued at the above indicated temperatures and pressures until the iodine number has been reduced to about 50 or 60.

The process of the invention may thereafter follow one or the other of two different embodiments. In one embodiment the hydrogenated oil may be removed from the reactor, cooled to a relatively low temperature which is desirably below 25° C., preferably about 20° C., and then filtered to remove a portion only of the residual oil. The cooling causes the hydrogenated portions of the fish oils to crystallize, leaving about 50 to 60% of the vitamins concentrated in the residual fluid oil. Part or all of the residual oil with the vitamins may be removed after filtration by means of a high speed centrifuge or hydraulic press and used for vitamin concentrate purposes. It is preferable that a portion of the vitamin-containing oil be left in the filter cake to the extent of about 40 to 50%. The filter cake containing a substantial amount of the catalyst is then dispersed in a substantial portion of another suitable oil which may be cottonseed oil, peanut oil, coconut or other vegetable oil or mixtures thereof. The mixed oils are then returned to the reactor and further hydrogenated to reduce the iodine number of the mixture to about 60.

The mixture is then filtered hot at about 50° to 60° C. to remove the catalyst and filter aid to yield a clear oil.

It is observed that hydrogenation sufficient to reduce the iodine number to 50 or 60 completely destroys the fishy taste and odor but tends to substitute for the fish odor a mild odor somewhat like slightly rancid butter. This odor is conveniently removed by one or the other of two processes. Preferably, the melted oil, either before or after removal of the catayIst, is treated with a stream of inert gas, preferably, carbon dioxide, although both nitrogen and hydrogen will serve. Preferably, the stream of inert gas is passed through the oil from a porous tile or other dispersing device at a relatively low pressure which is desirably at least as low as 500 mm. of mercury and preferably still lower, down to the lowest pressure which is commercially attainable without large expense. The treatment with inert gas such as $CO_2$ under vacuum conditions rapidly removes the odorous principle, the exact character of which is unknown but appears to be a by-product of the hydrogenation process. Thus, the resulting oil contains all of the vitamins and is free from taste or odor.

Alternatively, the hydrogenated oil may be steam treated either at atmospheric pressure or at reduced pressure, preferably with slightly superheated steam, the oil being held at the temperature of the superheated steam. The steam likewise rapidly removes the residual odor principle and leaves a clear, odorless and tasteless oil. Reduced pressure for the steaming treatment is, however, preferable in order that the temperature may be kept as low as possible. For this purpose, the temperature is preferably kept below 75° C. and the pressure below 289 mm. of mercury. At such temperatures and pressures the odorous principles are rapidly removed by the current of steam without destruction of the vitamin content.

This oil then is desirably fed to a chill roll on which the entire oil is cooled in a homogeneous film which is then scraped off by a doctor knife and removed into a suitable trough with a suitable conveyor spiral where it is churned in the presence of carbon dioxide and after sufficient plasticity has been obtained it is discharged into appropriate containers. During the cooling and packaging, the material is desirably protected by an atmosphere of $CO_2$ within a gas surrounding the chill roll, trough and agitator or churning trough.

The resulting product contains a substantial amount of vitamins A, D, and a small amount of E, and has a desirable melting point which may range from 35° C. to 50° C. according to the time, nature of the vegetable oil, or mixtures of such oils and vigor of hydrogenation. The product not only is clear but is tasteless and odorless. It is particularly adapted to such uses as the baking of bread, in which use the vitamin content is retained in substantial measure in view of the fact that the interior portions of the bread and other pastry really is heated above 100° C., a temperature too low to harm the vitamin D and a temperature at which a substantial portion of the vitamin A remains undestroyed. For frying, either pan frying or deep fat frying, the time and temperature are such that a substantial portion of the vitamins are destroyed. Nevertheless a worthwhile portion of vitamin enters the baked goods, thereby improving their health-giving qualities.

Alternatively, at the close of the hydrogenation step, substantially all of the vitamin-carrying residual oil may be expressed and used as vitamin concentrate and the residual, rather hard fat may be used as recovered, or may be diluted with vegetable oil and rehydrogenated to a suitable melting point for use as a lard substitute.

While there are above disclosed but a limited number of embodiments of the inventive concept, it is possible to produce still other embodiments without departure from the inventive concept and it is therefore desired that only such limitations be enclosed in the appended claims as are stated therein or required in the prior art.

I claim:

1. The process of preparing a shortening fat comprising the steps of expressing fish oils, catalytically hydrogenating the fish oil at a temperature between room temperature and 60° C. and a pressure between 200 pounds per square inch and 500 pounds per square inch, mixing the hydrogenated fish oils with vegetable oil and further hydrogenating the mixture at the same temperature and pressure, removing the catalyst and chilling a homogeneous mixture of the hydrogenated oils to produce a tasteless and odorless shortening fat.

2. The process of preparing a fat soluble vitamin containing shortening comprising the steps of catalytically hydrogenating a vitamin bearing fish oil at a temperature below 60° C. and a pressure above 200 pounds per sq. in. and below 500 pounds per sq. in., mixing the hydrogenated fish oil with a vegetable oil and further hydrogenating the mixture at the said temperature and pressures, removing the catalyst, steam treating the hydrogenated combination and chilling a homogeneous mixture of the hydrogenated oils, said combination having an iodine number below about 60 and free from undesirable taste and odor.

3. The process of preparing a vitamin containing shortening fat comprising the steps of expressing a vitamin bearing fish oil, catalytically hydrogenating the fish oil at a temperature below 60° C. and a pressure above 200 pounds per sq. in. and below 500 pounds per sq. in., dispersing the filter cake in a vegetable oil and further hydrogenating the mixture at the said temperature and pressures until the iodine number of the mixed hydrogenated fish oil and partially hydrogenated vegetable oil is reduced to a value below 60.

JAMES G. BLASO.